United States Patent

Kovalovsky

[11] Patent Number: 4,482,106
[45] Date of Patent: Nov. 13, 1984

[54] GEARED FISHING REEL

[76] Inventor: Oscar Kovalovsky, 11154 Debby St., North Hollywood, Calif. 91606

[21] Appl. No.: 424,869

[22] Filed: Sep. 28, 1982

[51] Int. Cl.³ .................. A01K 89/015; A01K 89/02
[52] U.S. Cl. .................... 242/220; 242/84.51 R; 242/221
[58] Field of Search ................ 242/84.1 R, 211, 212, 242/213, 214, 216, 218, 219, 220, 221, 84.5 R, 84.51 R; 74/577 R, 577 S, 63, 68, 69; 192/41 R, 41 S, 41 A, 46

[56] References Cited

U.S. PATENT DOCUMENTS

| 731,226 | 6/1903 | Rockwell | 242/84.1 R |
| 1,836,755 | 12/1931 | Hirsch | 242/213 |
| 2,209,598 | 7/1940 | Coxe | 242/220 |
| 3,478,978 | 11/1969 | Nurmse | 242/85.51 R |
| 3,603,524 | 9/1971 | Nurmse | 242/84.1 R |
| 3,829,041 | 8/1974 | Nepote | 242/219 |
| 3,874,615 | 4/1975 | Fukushima | 242/219 |

Primary Examiner—Billy S. Taylor
Attorney, Agent, or Firm—Roger A. Marrs

[57] ABSTRACT

A geared fishing reel is disclosed herein having a supporting frame with opposite end plates rotatably mounting a central shaft carrying a fishing line storage spool. A turning assembly including a crank handle is operably carried on the frame for rotating the spool via the central shaft. The turning assembly includes a movable drive latch carried on a crank plate for selective engagement with a lug projecting laterally from a drive gear meshed with a pinion gear carried on the end of the central shaft in order to achieve non-slip, positive direct drive of the spool by the crank handle. A latch disconnect mechanism is operably carried between the crank plate and the frame for automatically disengaging the drive latch from driving the gear lug via a release blade pivotally mounted on the frame and which further includes a timing mechanism turning with the crank plate and handle cooperating with a pawl disposed on the frame. A spool drag adjuster assembly including a lever control supplies spool drag for tensioning the fishing line during fishing line pull when the spool rotates clockwise when positive drive rotation has been disconnected so that the fishing line tension is applied only by the drag adjuster assembly including a pad carried on the frame bearing against a brake shoe on the side of the spool via a friction disc.

8 Claims, 21 Drawing Figures

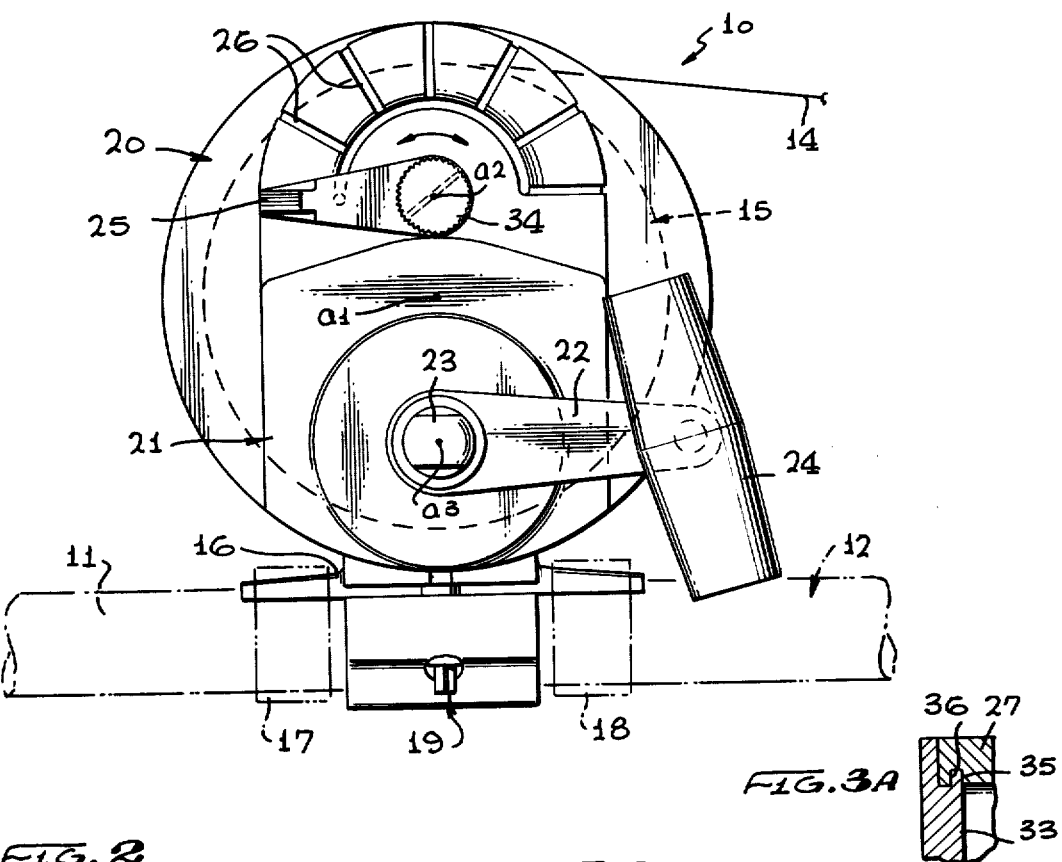
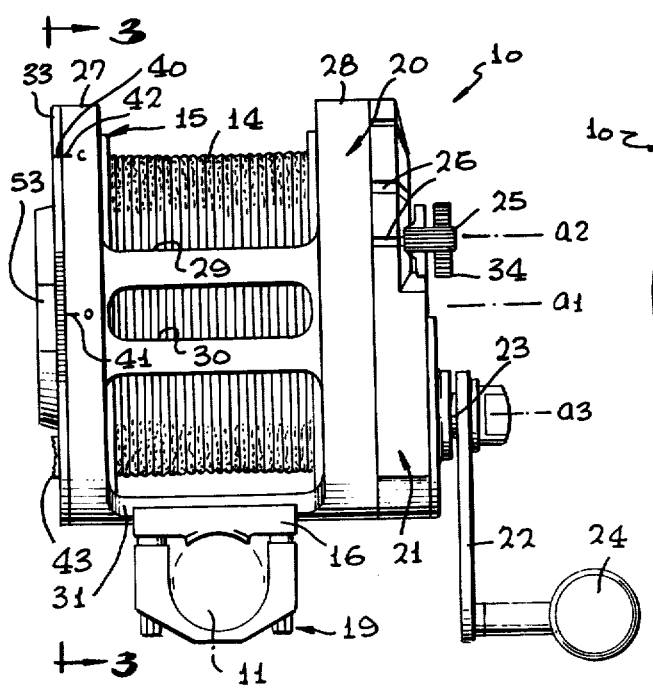
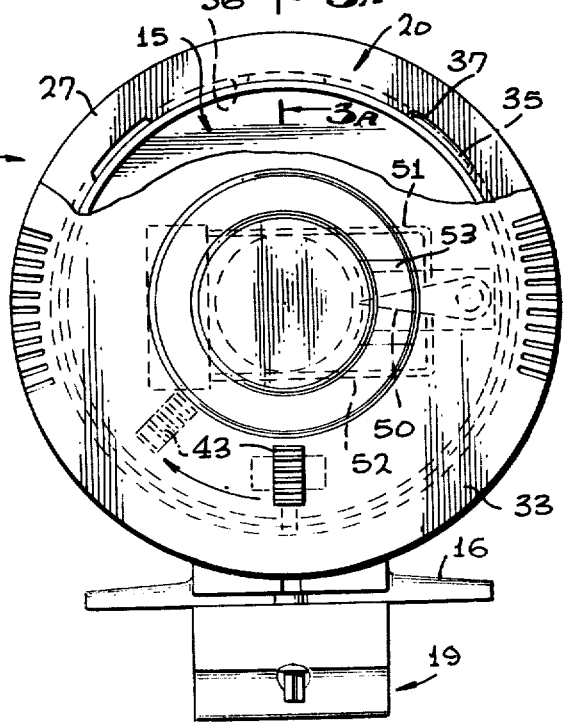

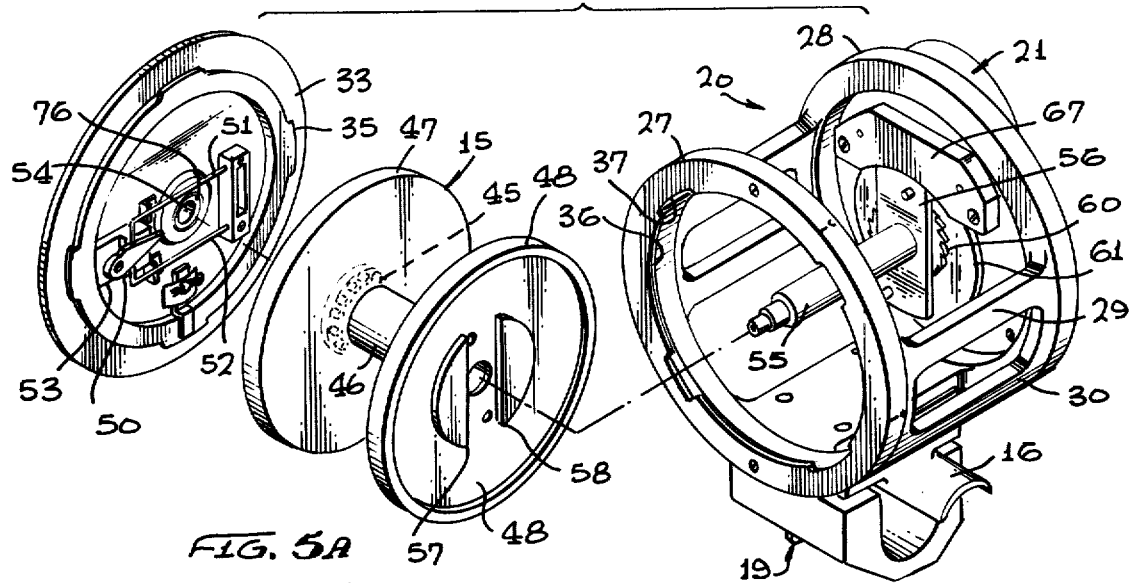
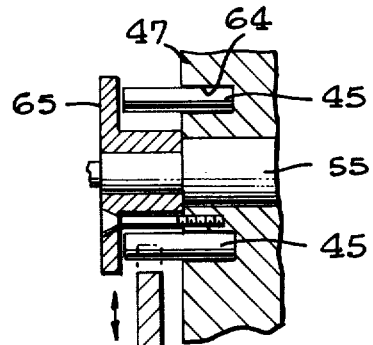
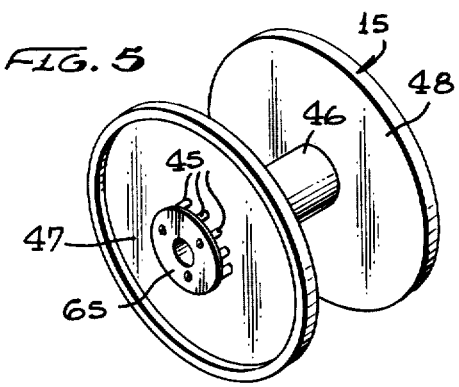
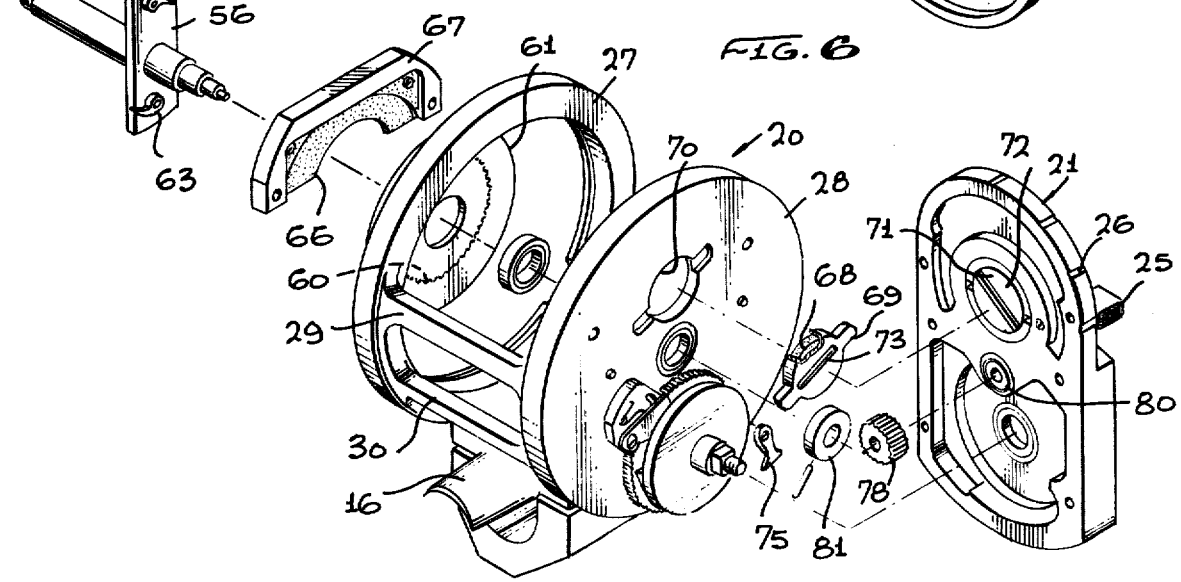

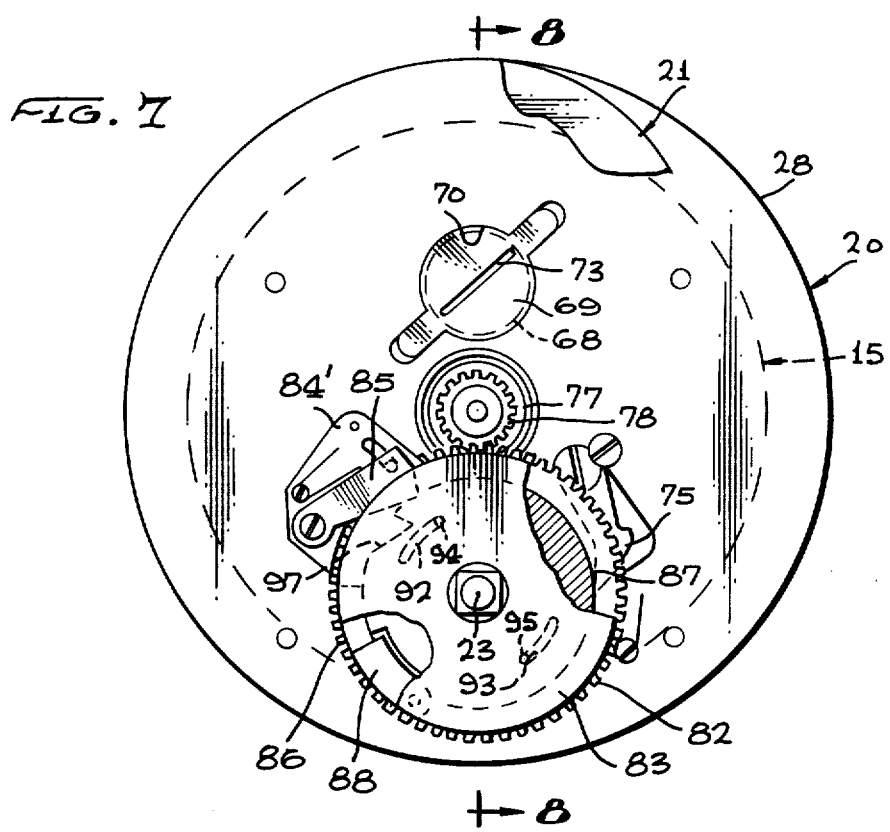
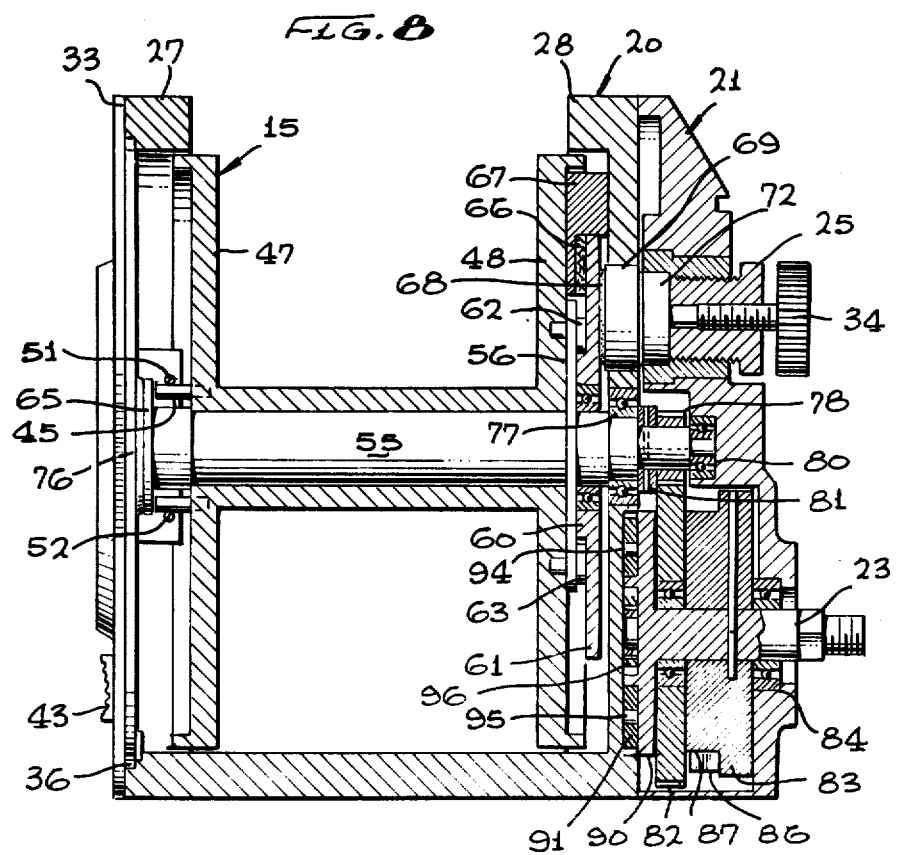

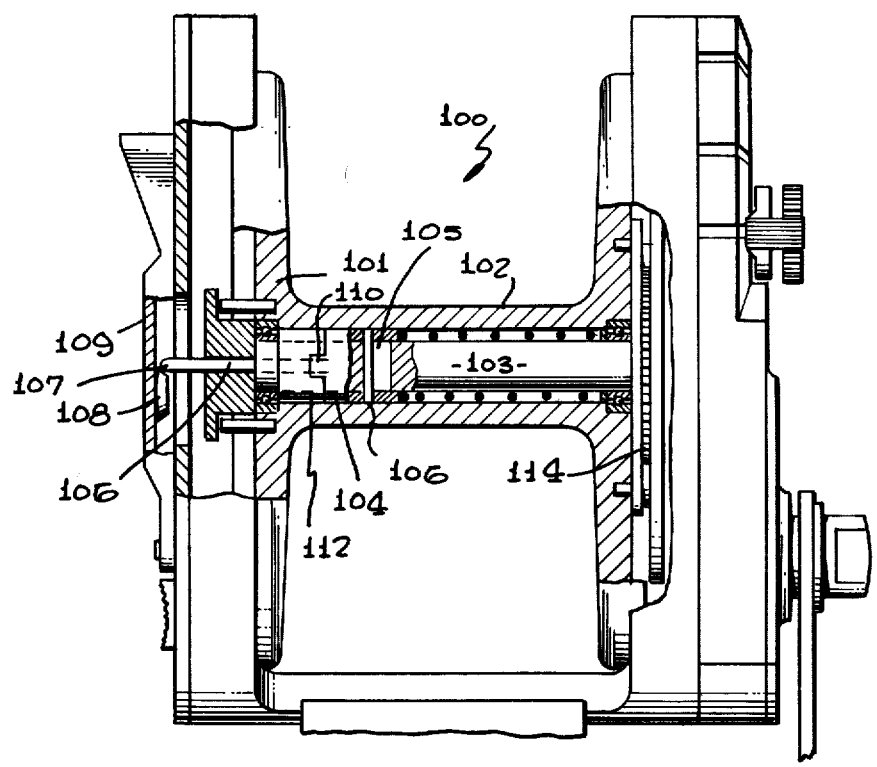
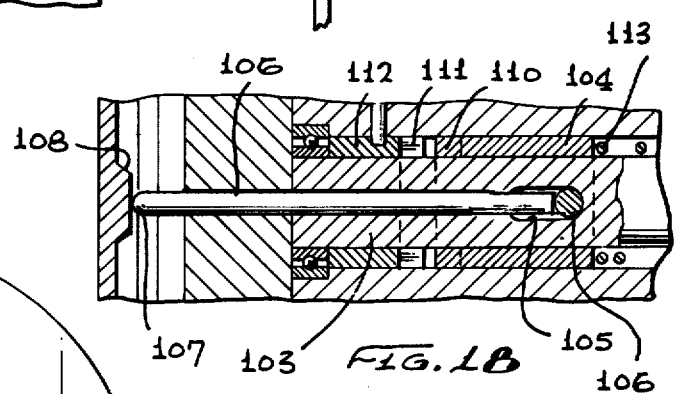
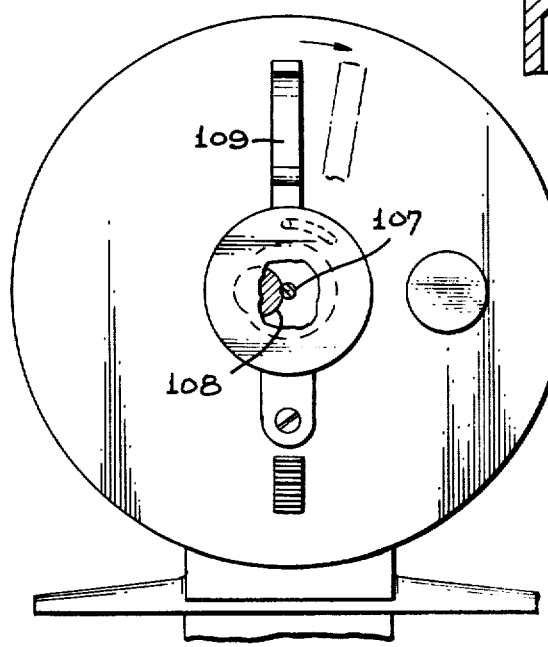
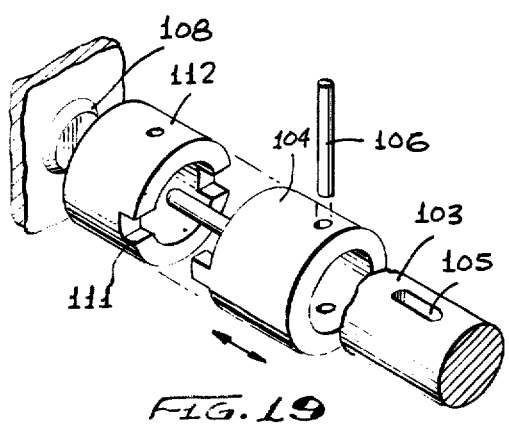

GEARED FISHING REEL

BACKGROUND OF THE INVENTION

1. Field of the Invention

The present invention relates to gear driven fishing reels and, more particularly, to a novel geared fishing reel having non-slip retrieval of a spool of fishing line incorporating a lever controlled rotor disc drag system and an automatic spool drive disconnect effective when a caught fish overpowers the fisherman's grip on the winding crank or knob.

2. Brief Description of the Prior Art

In the past, prior fishing reels have been developed without drag systems, with frictional devices incorporating a spring loaded pawl sliding over a series of geared teeth and other various designs of frictional devices which retard an out-going spool of fishing line at an adjustable rate of friction. One such prior fishing reel fastens the winding knob or crank directly to the spool by intermeshed gears so that when the captured fish exerts a tension on the fishing line to draw the line from the spool, the winding knob or crank rotates with the spool regardless of what type of retardation or drag system is employed. Obviously, if the user's fingers are not released immediately from the crank or knob permitting the fish to make his getaway run, there is the chance of either line breakage or a further along failure of the leader, hook, etc. will occur. When the fisherman's fingers are released from the winding knob or crank, the knob or crank rotates or spins in a reverse direction and the speed of rotation can exceed several thousand revolutions per minute while under considerable force. This means that the user must be aware not to attempt to stop the movement of the spinning knob or crank since severe injury will result.

Also, prior fishing reels employ disc drag systems which use thrust in applying drag tensions which is an inherent disadvantage to such systems and to the operation of the reel. Also, prior drag tension applicators are not visually noticeable so that the user has no idea as to the amount of tension being applied and must rely solely on the "feel" of the fishing line tension. A further problem in such conventional lever controlled drag systems resides in the inability to provide or accommodate a quickly removable spool so that prior designs do not lend themselves to a quick dismantling. Currently, it is a distinct advantage to easily change spools having different fishing line testing strength capacities such as in competing in tournaments or attempting for a record catch for a certain line strength category.

Therefore, a long standing need has existed to provide a means whereby the retrieving of fishing line that is being held taut by a sizeable fish can be accomplished in a non-slip, positive manner while incorporating a lever control drag tension system against which the fish exert his energy. Also, it is important that the crank or winding knob on the reel must not revolve in the opposite direction to the retrieval rotation more than one complete revolution when the fish overpowers the user's grip on the winding knob.

Also it is important to have a geared ratio between the winding crank and the spool to speed up the retrieving of the line in comparison to the energy imparted to the winding crank via the fisherman's hand.

SUMMARY OF THE INVENTION

Accordingly, the above problems and difficulties are obviated by the present invention which provides a novel geared fishing reel having a fishing line storage spool rotatably carried on a frame and having rotation means including meshed gears interconnected therebetween. Direct drive means are are operably provided in the rotation means between a turning crank and a drive gear for driving the spool via the drive gear in a direct and positive manner. Disconnect means are operably connected between the turning crank and the frame for automatically releasing the direct drive means with respect to the drive gear to permit play-out of fishing line from the spool. Drag adjustor means are selectively interposed between the frame and the spool for tensioning the fishing line during the play-out of line when the direct drive has been released. The drag adjustor means includes a lever drag tension control adapted to impart applied tension only to an out-going line spool direction.

Therefore, it is among the primary objects of the present invention to provide a novel fishing reel providing a means whereby the retrieving of the fishing line held taut by a captured fish can be achieved in a non-slip positive manner incorporating an adjustable drag system against which the fish must exert its energy.

Yet another object of the present invention is to provide a novel fishing reel having a non-slip, positive drive means wherein the drive means may be automatically released by a reverse direction of the cranking means incorporated therein whereby the crank or winding knob does not revolve in the opposite direction to the retrieve rotation more than one complete revolution when the captured fish overpowers the angler's grip on the winding knob.

Another object of the present invention is to provide a novel fishing reel having a winding knob or crank that remains stationary while a captured fish is withdrawing fishing line from its storage condition on a spool so that the tension of an adjustable drag system may be easily and quickly controlled. Control includes a rotational lever permitting the applied tension to be only imparted to an out-going line spool direction.

Still another object of the present invention is to provide a novel fishing reel having a lever control drag tension applicator which has the advantage of being visibly noticeable to the user pertaining to the amount of tension being applied to the fishing line.

Yet another object of the present invention is to provide a novel lever control drag tension applicator for a fishing reel where provision is provided for compensation of friction piece wear, from extended usage, or to initially pre-set the amount of tension desired at any position on the tension control lever.

Still a further object of the present invention is to provide a novel "click" mechanism in a fishing reel composed of a plurality of hardened pins inserted into slip-fit holes in a circular configuration and retained by a cover which employs a pivoted finger spring bias to sequentially engage the respective pins as the fishing line storage spool is rotated.

Yet another object of the present invention is to provide a novel fishing reel having a direct drive means and a disconnect means therefor providing the ability of retrieving a fishing line without slippage and yet prevent the winding crank from rotating in a counterclockwise rotation no more than one complete revolution. By applying a geared drive, more fishing line can be wound on a spool with fewer turns of the crank and including a lever control drag tension system provides added convenience to the user.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of the novel fishing reel incorporating the present invention;

FIG. 2 is a front elevational view of the fishing reel;

FIG. 3 is a side elevational view, partly broken away to expose internal construction, of the fishing reel taken from the opposite side from that shown in FIG. 1;

FIG. 3A is a fragmentary sectional view of a cover engagement as taken in the direction of arrows 3A—3A of FIG. 3;

FIG. 4 is an exploded view of the novel fishing reel illustrating the frame, rotating spool and end plate with clicker means;

FIG. 5 is a perspective view of the fishing line storage spool;

FIG. 5A is a sectional view of a portion of the clicker system;

FIG. 6 is an exploded perspective view of the fishing reel illustrating the spool shaft and adjustable drag means and the spool turning means;

FIG. 7 is an enlarged end view of the fishing reel having a portion of the housing broken away to expose components of the spool turning means;

FIG. 8 is a transverse cross-sectional view of the fishing reel shown in FIG. 7 as taken in the direction of arrows 8—8 thereof;

FIG. 16 is a front elevational view, partially broken away, of another embodiment of the present invention illustrating a releasable direct drive means for the fishing line storage spool;

FIG. 17 is a side elevational view of the fishing reel shown in FIG. 16 illustrating the manual control;

FIG. 18 is an enlarged fragmentary cross-sectional view of the direct drive mechanism; and FIG. 19 is an exploded perspective view of the direct drive means incorporated in the versions shown in FIGS. 16-18 inclusive.

DESCRIPTION OF THE PREFERRED EMBODIMENTS

Figure 9:
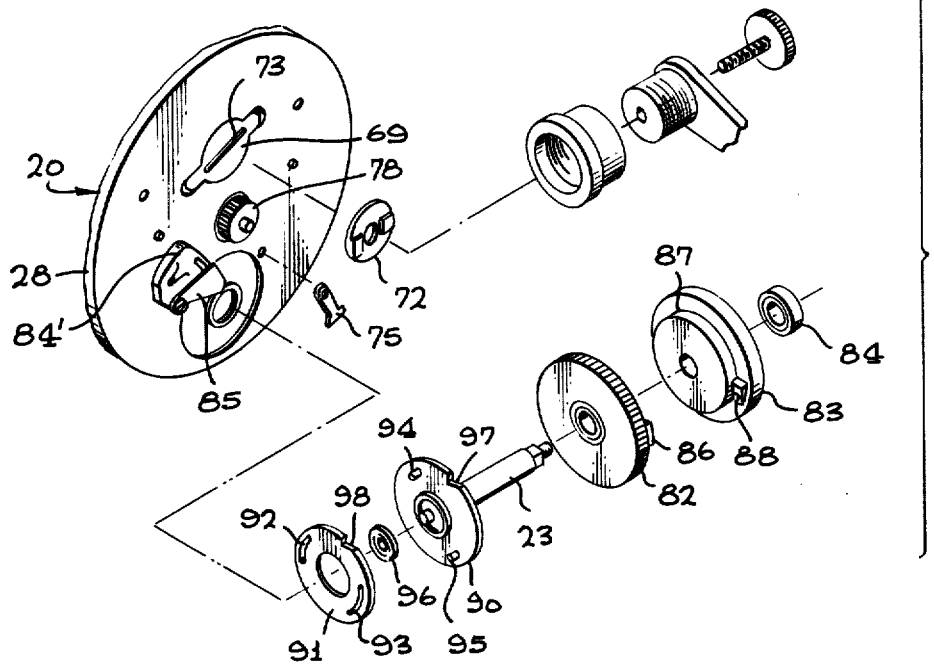
FIG. 9 is an exploded perspective view of a portion of the fishing reel showing the components of the turning means or assembly including the delay timing means and the disconnect means as well as a portion of the drag adjustor means.

Referring to FIG. 1, the novel fishing reel of the present invention is illustrated in the general direction of arrow 10 where like reference numerals refer to like parts in the different figures of the drawing. The fishing reel 10 is illustrated in a conventional operational manner as being placed on top of the butt or handle portion 11 of a fishing rod 12 in a detachable relationship therewith. Also, as is the conventional practice, a fishing line 14 is illustrated extending from its storage position on the spool 15 and outwardly extending through a series of guides (not shown) carried along the length of the rod 12. For mounting purposes, the fishing reel 10 includes a base 16 which is releasably clamped onto the handle 11 by means of suitable clamps 17 and 18.

The fishing reel 10 includes a frame 20 which carries the base 16 and encloses the various components of the reel which includes a spool turning mechanism or means carried within a housing 21. The turning means includes an exterior crank handle 22 carried on one end of a turning shaft 23. A suitable knob 24 is pivotally carried on the end of the crank handle 22 opposite from its end connected to the shaft 23 which may be readily grasped by the fingers of the user and rotated in a clockwise direction to retrieve or crank in on the fishing line 14 for storage on the spool 15. When it is desired to permit the spool 15 to pay-out or advance the fishing line from storage, the spool will rotate in a clockwise direction.

The fishing reel 10 includes a lever control drag tension applicator taking the form of a rotatable lever arm 25 adapted to travel in an arcuate path across a series of visual indicators or markings such as indicated by numeral 26. Therefore, the lever control drag tension applicator has the advantage of being visually noticeable by the user as to the amount of tension being applied to the spool 15 and hence to the fishing line 14. By means of a knob 34 provision is provided compensating for drag component parts wear or to initially "pre-set" the amount of tension desired at any position of the tension control lever 25 with respect to the markings on the frame. In general, the lever control drag tension applicator operates a drag adjuster means or mechanism which is employed to selectively apply a braking action to the spool for adjusting the tension on the line 14. Adjustment of the drag mechanism is achieved by rotating the lever 25 threadably engaged on the housing.

It should be noted that heretofore, conventional fishing reels of the geared type employing a lever control drag have been difficult if not impossible to design in order to accommodate a quickly removable spool. The complicated drag systems being applied directly upon one or both sides of the spool itself does not lend itself to quick disassembly or dismantling. Therefore, a feature of the present invention resides in providing a take-apart frame with quick changeable spools so that the user is enabled to easily change spools having different fishing line testing strength capacities for competing in tournaments or trying for a record catch by certain line strength category.

In this connection, reference is now made to FIG. 2 in which it can be seen that the frame 20 includes a pair of ends 27 and 28 which are joined together by cross braces 29 and 30 as well as a cross bar 31 integrally formed with the base 13. The spool 15 is rotatably carried between the ends 27 and 28 and a storage of line 14 is shown thereon. The end 27 of the frame 20 is enclosed by a cover 33 while the housing 21 is attached to and covers the end 28. The adjustable drag means include a knurled knob 34 which lies on the turning axis a2 in common with the turning axis of the lever 25. The turning axis for the spool 15 is indicated by the line identified as a1 while the turning axis of the crank 22 and the turning means enclosed within housing 21 is indicated along the line indicated by numeral a3.

In order to remove the spool 15, cover 33 may be removed by rotating the cover so as to disengage projection latches 35 from a groove 36 located on the inside of the end 27 by aligning the latch with the opening 37 as shown in FIGS. 3 and particularly 3A. By aligning an index marker 40 carried on the edge of cover 33 with a marker 41 carried on the edge of end 27, the user is assured that the latch 35 is in alignment opening 37 so that the cover may either be attached or disattached with the end 27. For attaching purposes, the cover is rotated in a direction until the index marker 40 aligns with a close marker 42 wherein the user understands that the cover is fixedly attached to end 27. A slide lock 43 is provided which is first moved upwardly as shown in FIG. 3 and then rotated clockwise to the broken line position at which time the cover 33 may be rotated to remove.

Referring now in detail to FIG. 4, the fishing reel of the present invention includes a novel audible warning device, commonly known as a clicker which includes the replacement of a conventional ratchet tooth wheel with a series of hardened pins 45 arranged in a coaxial relationship with the cross member 46 of the spool 15. The pins are arranged on a circular flange 47 of the spool fastened on one end of the cross member 46 while a second flange 48 is fastened on the other end of the cross member. The pins 45 are adapted to be engaged by a spring biased finger 50 which is pivotally carried on the inside of the cover 33. The spring bias is provided by a pair of spring members 51 and 52 arranged on opposite sides of the elongated, pivotal finger 50. When a finger plate 53 is moved back and forth in the direction of the double arrow, the extreme tip of the finger 50 is disposed to interfere with the plurality of pins 45 so that as the spool 15 rotates, the finger will sequentially strike against each of the respective pins and make a clicking or warning sound. When it is desired to disengage the clicker, the slide 53 is moved away from the row of pins so that the end of the finger will not engage therewith.

It can also be seen that the cover plate 33 includes a shaft bearing 54 which serves to receive one end of a spool shaft 55 carried on the frame 20 for mounting the spool 15 inside of the cross member 46.

The spool 15 is keyed to the shaft 55 so that both move in a unitary manner by means of a pawl plate 56 fixed to the end of the shaft 55 and adapted to be disposed between a pair of separated lobes 57 and 58 so that the rotary movement of the shaft 55 is imparted to the spool 15 via the keyed relationship between the pawl plate 56 and the lobes 57 and 58. A ratchet gear 60 is carried on the end of the shaft 55 between the pawl plate 56 and a rotor disc 61. The ratchet gear 60 operates in conjunction with a pair of pivoting pawls 62 and 63 carried on the opposite ends of the pawl plate 56 as shown more clearly in FIG. 6. In operation, through the use of the ratchet 60 which is integral with the rotor disc 61 to allow the applied tension from the lever 25 to only be imparted to an out-going line spool direction.

Hence, when the crank 22 is rotated clockwise, the spool 15 turns counterclockwise retrieving the line 14 on the spool. In this direction of operation, the rotor disc 61 remains stationary due to applied tension of the lever control 25 and the main shaft 55 carrying the spool ratchets from the pawl action. However, immediately upon a fish pulling the line from the spool, the pawls 62 and 63 engage with the teeth of the ratchet gear 60. This in turn, rotates the rotor disc 61 under whatever applied tension is adjusted by the control lever 25. At the same time, the crank 22 moves in a counterclockwise direction until such time that an automatic disconnect (to be described later) allows the crank to stop rotation.

Referring now to FIGS. 5 and 5A, it can be seen that the plurality of hardened pins 45 are arranged in a circle coaxial with the turning axis of the spool 15 and that the series of hardened pins are inserted into slip-fit holes, such as hole 64 in the side flange 47 of the spool. Retention of the pins is achieved by a cover 65 and suitable screws. It should be noted that when employing a conventional toothed wheel, ordinary wear renders the teeth useless after a short period of time and it is a major undertaking to replace or repair the toothed wheel. By employing easily replaceable multiple hardened pins 45, wear can still occur and it is a simple operation to replace the pins which are available stock items. Also, while the pins are subject to wear, they are loose, slip fitted into their retaining hole and therefore have a tendency to rotate on their own axis as they are subjected to the action of the finger 50. Thus, useful life of the pins are considerably increased.

Referring now in detail to FIG. 6, a frictional brake means is included in the reel 10 which includes a brake shoe 66 carried on a holder 67 which is fixed directly to the end 28 of the frame or cage 20. One surface of the rotor disc 61 is adapted to bear against the shoe 66 when pressure is applied from its opposite side by a pad 68 carried on a holder 69. The holder 69 fits into an aperture 70 in the end piece 28 and is moved laterally towards the rotor disc 61 by means of a pressure pad 71 inasmuch as an elongated ridge 72 rides in and out of a corresponding groove 73 on the back side of the holder 69.

It is noted that the friction brake pad areas involving the shoe 66, disc 61 and pad 68 are not a full, continual 360° of contact but are of a caliper pad style. Inasmuch as the brake rotor disc 61 is subject to water contact, the partial diameter brake pads have a wiping action to rid the rotor 61 of the water and at the same time by applying friction over a smaller area, there is a cooling effect to the unpressed remaining portion of the rotor. Conventional full area brake systems have the disadvantage of what is known as "break-away." When the full area brake is set up with a very heavy amount of drag tension, the starting rotation of the spool will impart a somewhat heavier drag then once the spool is under rotation. In other words, the initial spool rotation resistance will be much heavier than after the spool is rotated. Such is very undesirable whereas, the partial caliper pad type incorporated in the present invention eliminates this initial break-away drag tension.

The central spool shaft 55 is rotatably carried on the cage or frame ends 27 and 28 through roller bearings 76 and 77 and the extreme end of the shaft 55 terminates in a driven pinion gear 78 and a bearing 80 carried on the housing 21. A spacer 81 separates the gear 78 from the inner race of the bearing 77 so as to accommodate the delay timing means (to be described later).

The turning means for positively driving the spool 15 includes the driven gear 78 in mesh with a drive gear 82 rotatable on shaft 23. The crank handle 22 is attached to the shaft 23 which rotatably mounts in the housing 21 via bearing 84. A disconnect mechansim is carried on the cage or frame end 28 by means of spacing mount 84' to which a pivoting blade 85 is movably attached. The blade 85 is disposed between the crank plate 83 and the drive gear 82. A delay timing means cooperates with the disconnect means and includes a pivoting pawl 75 attached to the frame end 28.

Referring now in detail to FIG. 7, it can be seen that the turning means includes a fixed lug 86 carried on the side of the drive gear facing the crank plate 83. The crank plate 83 includes an enlarged portion spaced from the opposing surface of the drive gear 82 by a reduce portion 87. A drive latch 88 is pivotally carried from the enlarged portion on the crank plate 83 and is biased laterally by spring means to occpy the space between the opposing surfaces of the drive gear and the enlarged portion of the crank plate 83 immediately above the periphery of the reduced portion 87. Such a relationship is more clearly shown in FIG. 8.

FIG. 7 also shows that the drive latch 88 is in a driving relationship with the lug 86 so that as the crank plate 83 is rotated, rotational movement is imparted through the drive gear 82 and, hence to the pinion gear 78 and to the shaft 55 and spool 15. When the crank plate 83 is moved in an opposite direction, the drive latch 88 separates from the lug 86 and somewhere along its rotation less than one revolution will cause the blade 85 to sweep past the drive latch 88 and cause the latch to recess against its spring bias into the enlarged portion of the crank plate 83 so that no interference ensues.

Referring now to FIG. 8, the turning means further includes a delay timing mechanism comprising a first disc 90 attached at one end to the shaft 23 and which includes a movable disc 91 having elongated slots 92 and 93 shown in FIG. 7, into which a pair of pins 94 and 95 are inserted. A bearing 96 movably mounts the end of the shaft 23 opposite from its end carrying the crank handle 22. Therefore, it can be seen that the discs 90 and 91 rotate in unison with the drive gear 82 as the shaft 23 is rotated the end of timing pawl 75 rides directly on the peripheral surface of the discs 90 and 91 as shown in FIG. 7 and the pawl 75 is adapted to drop into respective notches provided on the disc such as notch 97 provided in the disc 90.

Referring to FIG. 9, an exploded view more clearly shows the parts of the turning mechanism including the delay timing means. The notch 97 is shown carried on the disc 90 while the notch 98 is carried on the disc 91. It is to be noted that the pawl 75 is pivotally carried on the frame 28 and that its toothed end or cam is normally biased into engagement with either one or both of the ratchet disc edge surfaces by means of a bias spring associated therewith.

It can also be seen that the blade 85 is biased into the path of the drive latch 88 as the crank plate 83 rotates. An expansion spring causes the blade to be normally biased into the path of the drive latch. When the crank plate is rotated in a clockwise direction, the drive latch wipes across the sloping surface of the blade and causes the blade to pivot out of the way of the latch against the expansion tension of the spring. However, when the crank plate is moved in a counterclockwise direction, and drive latch outside surface wipes against the blade causing the latch to move laterally into a recess in the large portion of the crank plate 83 and out of the way of the lug 86 which is carried on the opposing face of the drive gear 82. If the blade 85 were to be omitted and did not wipe the drive latch laterally as in conventional reels when the fishing line 14 became tensioned by a captured fish so that the spool rotates in a clockwise direction, the lug on the drive gear would bind against the drive latch and the crank plate would rotate in a counterclockwise direction causing the crank handle and knob to spin dangerously as described in the first part of the specification. However, by employing the blade to remove the latch from the path of the lug, the spool is free to spin only against the drag as applied the adjustable drag mechanism.

It is to be understood that a timing problem must be overcome in that the wiping blade is in a fixed position on the frame and the clockwise tensioned rotation of the spool may occur at any location of the drive latch along its circular path with respect to the fixed blade. Therefore, the counterclockwise rotation of the crank plate responsive to the clockwise rotation of the spool is effected for no more than a single revolution of the crank plate once the drive latch has been laterally moved into the recess of the crank plate by the wiper blade 85. Further counterclockwise rotation of the crank plate and winding knob is prevented by engagement of the pawl 75 with the notches 97 and 98 in the ratchet wheels or discs 90 and 91 respectively. However, the aforementioned engagement is slightly delayed in order to prevent jamming and it is for this reason that the secondary ratchet wheel or disc 91 is provided and that the pawl 75 rides on the surface thereof until the drive latch has been recessed within the large portion of crank plate 83. Such a timing mechanism is specifically shown in respect to the following figure description for FIGS. 10, 11 and 12.

Figure 10:
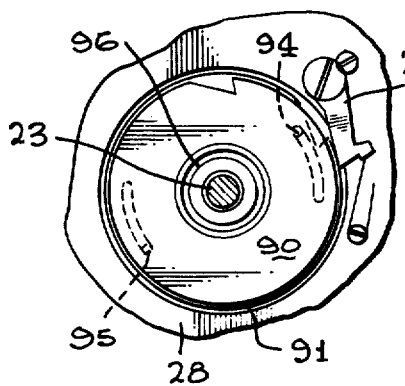
FIGS. 10, 11 and 12 are sequential views of the delay timing means employed in the disconnect mechanism for releasing the winding crank plate from the drive gear.

Referring now in detail to these latter figures, it is to be noted that in FIG. 10, the pawl 75 rides on the secondary or larger diameter ratchet disc 91 during the normal reel-in or fishing line retract procedure under positive drive. Shaft 23 and primary disc 90 rotate in a clockwise direction and pins 94 and 95 bear against the end of slots 92 and 93 in the secondary ratchet disc 91 to transmit the rotary force thereto. The tip of the pawl 75 rides on the edge surface of the secondary disc 91 and drops slightly into the notch 98 as rotation continues. Then, the pawl rides up a hump and onto the surface again.

Figure 11:
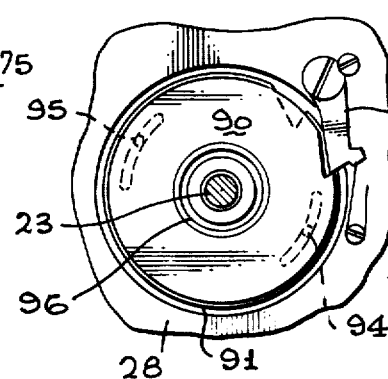

However, when the spool direction has been reversed to rotate in a clockwise direction and through the lug and drive engagement causes the plate 83 to move in a counterclockwise direction, it is noted that the shaft 23 will follow in a counterclockwise direction which causes the primary disc 90 to rotate in a counterclockwise direction and such movement removes the pins 94 and 95 from engagement with the ends of the slots as shown in FIG. 11. Such action causes a delay in aligning the notches 97 and 98 so that the pawl 75 cannot drop into both notches at the same time.

Figure 12:
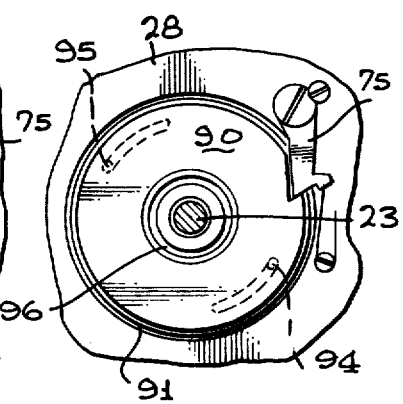

In FIG. 12, counterclockwise direction has continued to the extent that the pins 94 and 95 are at the opposite end of the slots 92 and 93 and in this configuration, the pawl may now drop into engagement with both notches since notches are in coincidence. At this point in time, the disconnect mechanism is complete for releasing the winding crank plate 83 from the device gear 82 in that the blade 85 has wiped the drive latch 88 back into its recess and out of the way of the lug 86 on the drive gear and rotation of the crank plate is prevented by engagement of the pawl with the notches in the ratchet discs so that the crank plate and its attending winding knob are at rest while the spool rotates clockwise and the drive gear is rotated in a counterclockwise direction against the adjustable drag mechanism.

Figure 13:
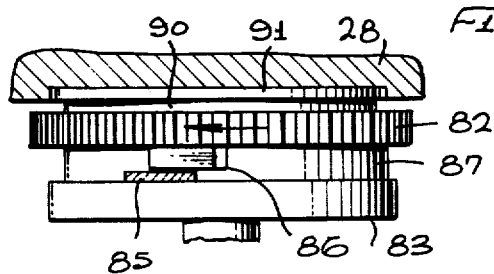
FIGS. 13, 14 and 15 are top plan views of the direct drive means illustrated in a sequence showing release by a release blade during the disconnect procedure in accordance with the timing sequence illustrated in FIGS. 10, 11 and 12 respectively.
Figure 14:
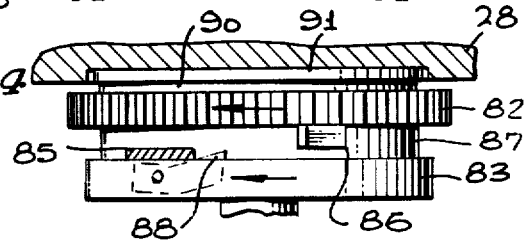
Figure 15:
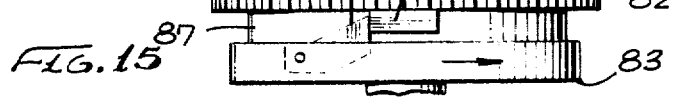

To more clearly illustrate the latch, lug and wiper blade positions, reference is now made to FIGS. 13, 14 and 15 wherein FIG. 15 shows the fishing line being positively retrieved by the winding crank and crank plate 83 since the drive latch 88 is outwardly projecting from the side of the enlarged portion into the path of the rotation of lug 86. The flat surface of the lug is engaged by the flat end of the latch so that as the crank plate is turned in a clockwise direction, the spool is turned in a counterclockwise direction and the line is retrieved. However, should the fish put tension on the line and cause the spool and drive gear to rotate in their respective directions, the plate will turn in a counterclockwise direction for a maximum of one revolution until such time as the wiper blade 85 wipes across the side of the drive latch 88 as shown in FIG. 14. This latter action causes the latch to pivot back into the recess out of the way of the oncoming lug 86. In FIG. 13, the blade is directly against the side of the latch and the lug 86 may pass thereby without any interference. The motion of the spool is in a clockwise direction and the crank plate is not moving at all. Movement is prohibited by the disconnect mechanism which includes not only the wiping blade but the ratchet and pawl mechanisms as a delay timing means shown in FIGS. 10, 11 and 12. The cessation of movement on the crank plate is achieved by pawl 75 engaging with the coinciding notches of the ratchet discs as previously described.

The present disclosure pertaining to a similar delay timing means and disconnect means, attention is directed to copending application for U.S. patent having Ser. No. 393,455 on June 29, 1982.

Provisions of the present invention permits the use of the dual drive fly reel in a positive retrieve mode and is further designed to be adapted to geared reels intended to be used on top of the rod. The adaptation for geared reels is also included in a fashion of trolling a bait or lure behind a moving vessel or with an adaptation of a free spool version such as is shown in FIG. 16. Such a reel can be employed for a free running spool for casting a bait or lure such as in fishing for bass in lakes, or the popular sport of ocean fishing from the surf, piers or from non-moving vessels. The trolling version of this reel allows the drag tension to be released to zero drag tension, but it should be noted that the out-going line not only turns the spool itself but turns the main shaft inasmuch as the spool and main shaft are keyed together and also, the rotor disc and the two gears. For use as a trolling reel, this is preferable over an absolute free running spool.

It should also be understood that the forward motion of a moving vessel would pull the line from the reel spool due to water friction when the drag tension adjuster is fully released. However, it would be virtually impossible to achieve any casting distance with such a reel when fishing from a stationary platform. Hence, the addition of a releasing mechanism which allows only the spool to turn by itself free of the additional friction of the main shaft, rotor disc and gears.

Referring now in detail to FIG. 16, another embodiment of the present invention is shown wherein the fishing reel is shown in the general direction of arrow 100 including a positive drive mechanism for rotating the spool 101. The hollow center of the cross section 102 of the spool includes a main shaft 103 having limited movement by virtue of a pin 106 passing through an elongated slot on the shaft 103 as designated as numeral 105. The pin 106 is carried on the collar 104 extending through the slot. The movement of the collar 104 is determined by engagement of the pin with opposite ends of the slot. Connected on the opposite end of the main shaft is an elongated rod 106 which includes a projecting end 107 that is adapted to follow or ride on a cam 108 provided on the inside surface of a control lever 109.

The collar 104 also includes a pair of projections 110 which are adapted to engage in recesses 111 carried on a ring 112 which is pinned to the spool hub 102. The collar 104 is of a larger diameter than the shaft 103 and a spring 113 expands against one side of the collar 104 so that the projections 110 are normally biased into position in the recesses 111 of the ring 112. The ring 112 is pinned in position to the hub 102, sliding on main shaft 103, allowing spool to be removed by hand as previously described.

Therefore, it can be seen that when the projections and recesses are meshed, direct drive is applied from the drive gear 114 directly to the spool and when the projections are disengaged with the recesses of the ring, the spool will freely spin. Engagement and disengagement is achieved by moving the rod 106 towards the collar 104 which moves the collar until the pin 106' engaged with the end of the slot and, at this time, the collar 104 is moved in the same direction out of engagement with the ring 112.

It is to be particularly noted that the rectilinear movement of the rod 106 is achieved by minor rotation of the lever arm 109 as shown in FIG. 17. The broken line position of the lever shows disengagement while the solid line position shows engagement. Disengagement of the collar 104 with the ring 112 places the reel in a free spinning position.

While particular embodiment of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a geared fishing reel having a spool rotatably carried on a frame for storing a length of fishing line, the combination comprising:

a winding means for driving said spool rotatably on said frame including a crank plate having a large diameter portion and a smaller diameter portion and an outwardly extending turning crank and knob and a drive gear rotatably carried with respect to said frame;

drag means carried on said frame for selective applied tensional engagement with said spool;

direct drive means cooperatively carried between said crank plate and said drive gear for non-slip, positive drive of said spool under control by said winding means and including a single lug laterally carried on said drive gear over the periphery of said crank plate smaller diameter portion;

a resiliently mounted latch disposed on said large diameter portion of said crank plate normally biased into abutting engagement with said drive gear lug as said crank plate is rotated in a winding direction;

disconnect means operably carried on said frame between said drive gear and said crank plate for disabling said direct drive means whereby said spool and said drive gear rotate to the exclusion of rotation of said winding means against the applied tension of said drag means.

2. The invention as defined in claim 1 wherein;

said disconnect means includes a blade pivotally carried on said frame normally biased into an interference path with said direct drive means latch; and said blade pivotal out of interference with said latch when said crank plate is rotated in a clockwise direction and said operating to pivot said latch out of engagement with said lug when said crank plate is rotated in a counterclockwise direction.

3. The invention as defined in claim 2 wherein;

said disconnect means further includes a timing mechanism connected between said frame and said crank plate for preventing counterclockwose rotation of said crank plate for more than one revolution.

4. The invention as defined in claim 3 including:

a central shaft rotatably mounting said spool to said frame;

a pinion gear carried on one of said shaft meshed with said drive gear;

a turning shaft rotatably carried on said frame having a turning axle parallel to and from the turning axis of said central shaft;

said crank plate fixed to said turning shaft so as to rotate therewith; and said drive gear rotatably mounted on said turning shaft adjacent to said crank plate.

5. The invention as defined in claim 4 including:

a drag means including an adjuster mechanism having friction pad movably carried on said frame and rotary for manually advancing and retracting said friction pad into and out of engagement with a brake shoe carried on said spool; and said rotary means rotating about an axis parallel to and spaced apart from the turning axis of said spool and said turning shaft.

6. The invention as defined in claim 1 including:

an audible sound mechanism cooperatively carried between said spool and said frame comprising a plurality of removable pins, outwardly projecting from one side of and coaxial with said spool and a resiliently biased pawl pivotally carried on said frame having a free end alternately engaged with each of said plurality of pins.

7. The invention as defined in claim 1 wherein:

said disconnect means includes a shaft rotatably supporting said spool and fixed to said winding means;

a decoupler means mounted on said shaft comprising a fixed ring and a slidable collar having registerable projections and notches respectively;

said collar normally biased into coupling engagement with said ring to direct drive said spool via said winding means; and manually operated rod means operably carried on said frame and slidable with respect to said shaft for selective engagement with said collar for moving said collar out of engagement with said ring against said bias.

8. The invention as defined in claim 1 including:

means operably carried on said frame for selectively removing said spool from said frame comprising a removable side plate carried on said frame having a lever latch mechanism for engaging and disengaging said plate with a selected side of said frame;

a tongue and groove arrangement cooperatively carried on the periphery of said plate and said selected frame side for selectively retaining said plate onto said frame side; and said spool retained on said frame when said side plate is retained and engaged on said frame and said spool being removable from said frame when said plate is unretained and disengaged from said frame.

* * * * *